Jan. 16, 1940.   P. L. MYER ET AL   2,187,360
TELEGRAPH SYSTEM AND APPARATUS
Filed March 6, 1936   3 Sheets-Sheet 2

INVENTORS
P. L. MYER
E. R. WHEELER
BY Eugene C. Brown
ATTORNEY

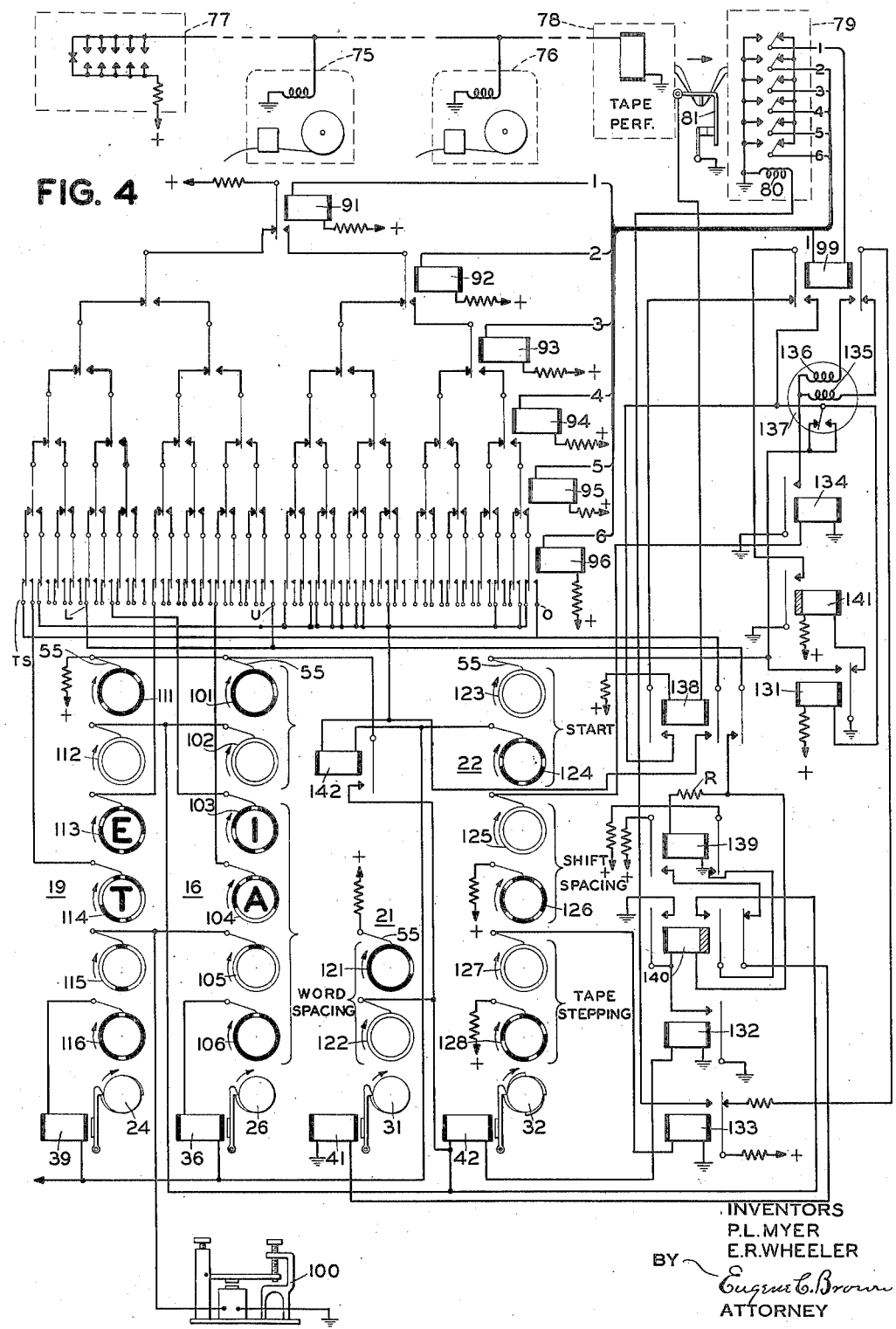

Patented Jan. 16, 1940

REISSUED APR 14 1942

2,187,360

UNITED STATES PATENT OFFICE 2,187,360

TELEGRAPH SYSTEM AND APPARATUS

Percy L. Myer, Ozone Park, N. Y., and Evan R. Wheeler, Plainfield, N. J., assignors to The Western Union Telegraph Company, New York, N. Y., a corporation of New York Application March 6, 1936, Serial No. 67,548

26 Claims. (Cl. 178—3)

This invention relates to telegraph systems and particularly to code transmitters and to systems and apparatus for converting uniform permutation code telegraph signals into Morse or other code signals of unequal length.

In market quotation system utilizing permutation code controlled self-winding or high speed tickers, the quotations received are usually posted on a blackboard in a broker's office. Ordinarily the tape bearing the printed quotations is read by an attendant and the quotations posted on the blackboard. In order to avoid the necessity for reading the tape by the attendant, in accordance with the invention the permutation code printer signals are converted into audible Morse code signals, for example, in order that an attendant who understands the Morse code may transcribe the quotations directly and without leaving or looking away from the blackboard. It is to be understood that any reference to the "Morse code" herein is intended to include other equivalent codes.

The printer signals for operating the tickers are transmitted at high speed although the groups of signals forming individual quotations may be so spaced that the average rate of transmission does not exceed the capacity of the operator or attendant. A further object of the invention, therefore, is to provide means for transmitting Morse code signals at a steady predetermined rate controlled by printer signals received at a different rate. Obviously, the invention is not limited to the transmission of market or other quotations but is applicable to different systems involving the conversion of equal-unit permutation code signals into Morse or other unequal-length code signals.

Another object of the invention is to provide an improved tape- or storage-controlled Morse code transmitter.

A further object of the invention is to provide an automatic Morse transmitter arranged to provide variable spacing between character signals and also between words and groups of character signals representing figures in order to simulate accurately the sending of an experienced operator.

A further object of the invention is to provide a tape controlled Morse transmitter in which the blank portions of the tape or those portions bearing spacing characters are stepped rapidly through the tape control device connected to the Morse transmitter to obviate undue delay in the transmission of signals subsequently received and stored in the tape.

A further object of the invention is to provide a tape-controlled Morse transmitter in which the transmission is suspended at the end of a word or quotation when the number of signals stored in the tape drops to a predetermined point, i. e., the length of the tape which is being fed to the tape transmitter decreases so that transmission must be stopped until further character signals are received. The purpose of this arrangement is to prevent the stopping of transmission in the middle of a word or quotation which would be undesirable in the case of the transmission of market quotations.

A further object of the invention is to provide, in a telegraph system having a signal storage unit such as a tape reperforator and as associated transmitter controlled thereby, means for stopping the transmitter when the number of character signals stored in the storage unit drops below a predetermined number, said means being inoperative until a predetermined signal is repeated by the transmitter or until the end of a group of character signals is reached. Thus, where the system is utilized for transmitting groups of signals, as words or quotations, the transmission stops only at the end of a group of character signals or upon the occurrence of a blank or spacing signal used to space the character signals forming a message.

Other objects and advantages of the invention will appear from the following description of a preferred embodiment thereof.

The invention will be described in connection with a quotation system employing tickers or other signal-receiving apparatus at the brokers' offices although it may be employed in other systems wherein equal-length code signals are to be converted into Morse signals, or signals stored in a tape are to be reproduced or transmitted in the form of Morse or similar code signals.

In the embodiment of the invention shown in the accompanying drawings, a Morse transmitter is provided which is adapted to send Morse code signals under the control of an equal-unit code signal storing and sending device, such for example as a six-unit reperforator and a tape transmitter. In accordance with the selections set up in the tape transmitter, the Morse code transmitter is variably operated and at the completion of each cycle of operation of the Morse code transmitter, the tape transmitter is stepped to the next character. Thus while the tape reperforator responds to the permutation code signals at one transmission rate, the tape transmitter associated therewith operates under the control of and in accordance with the Morse code transmitter which in general operates at a different rate than the reperforator.

The Morse code transmitter comprises a series of character transmitting drums and auxiliary drums driven by a common motor through friction clutches. Each of the drums is provided with code rings or contact segments and cooperating brush contacts adapted to make and break the transmitting and control circuits upon the rotation of the respective drums. The character transmitting drums operate at different speeds in accordance with the duration of the time interval necessary to send the Morse code signals for the different characters. The contact segments or code rings for the characters requiring the same or approximately the same time for transmission are disposed upon the same character transmitting drum.

The reperforator and associated tape transmitter are arranged to store and repeat the printer signals forming market quotations. Control apparatus is provided between the tape transmitter and the Morse code transmitter whereby the proper circuits through the transmitter drums for the formation of each Morse code signal are selected under the control of the tape transmitter. The character transmitting drum and the control drums selected are then released and during their rotation by the driving motor effect the closing of the sending circuit in accordance with the selected Morse code signal and step the tape transmitter to prepare the apparatus for the transmission of the next signal. In case the reperforator is connected to a ticker circuit used for transmitting market quotations, the quotations will frequently be spaced by blank spaces or so-called letter dots in the tape. When the tape transmitter reaches a space containing more than one blank or letter dot, the tape transmitter is stepped rapidly without affecting the Morse code transmitter until the next character code signal is reached in the tape. This feature obviates delay in the transmission of the quotations during any period when the quotations are accumulated in the tape ahead of the tape transmitter more rapidly than they are cleared out by the Morse code transmitter.

In order to avoid a distorted and mechanical form of Morse code transmission, the Morse code transmitter is arranged to provide variable spacing between characters such as C, O, R, Y, etc., which are combinations of dots and spaces, and further to provide a longer spacing between words than between individual characters and between words or groups of letters and groups of figures which are encountered in the transmission of market quotations. In the transmission of these signals and groups of signals by an experienced operator, the spacing is varied to facilitate the reading of the message and the present Morse code transmitter is arranged to vary the spacing in a similar manner by the use of the control drums as will be described in detail hereinafter.

Referring to the drawings:

Fig. 4 is a diagrammatic view of the circuit of the Morse code transmitter as arranged to transmit market quotations under the control of a reperforator and tape transmitter connected to a ticker circuit.

Figure 1:
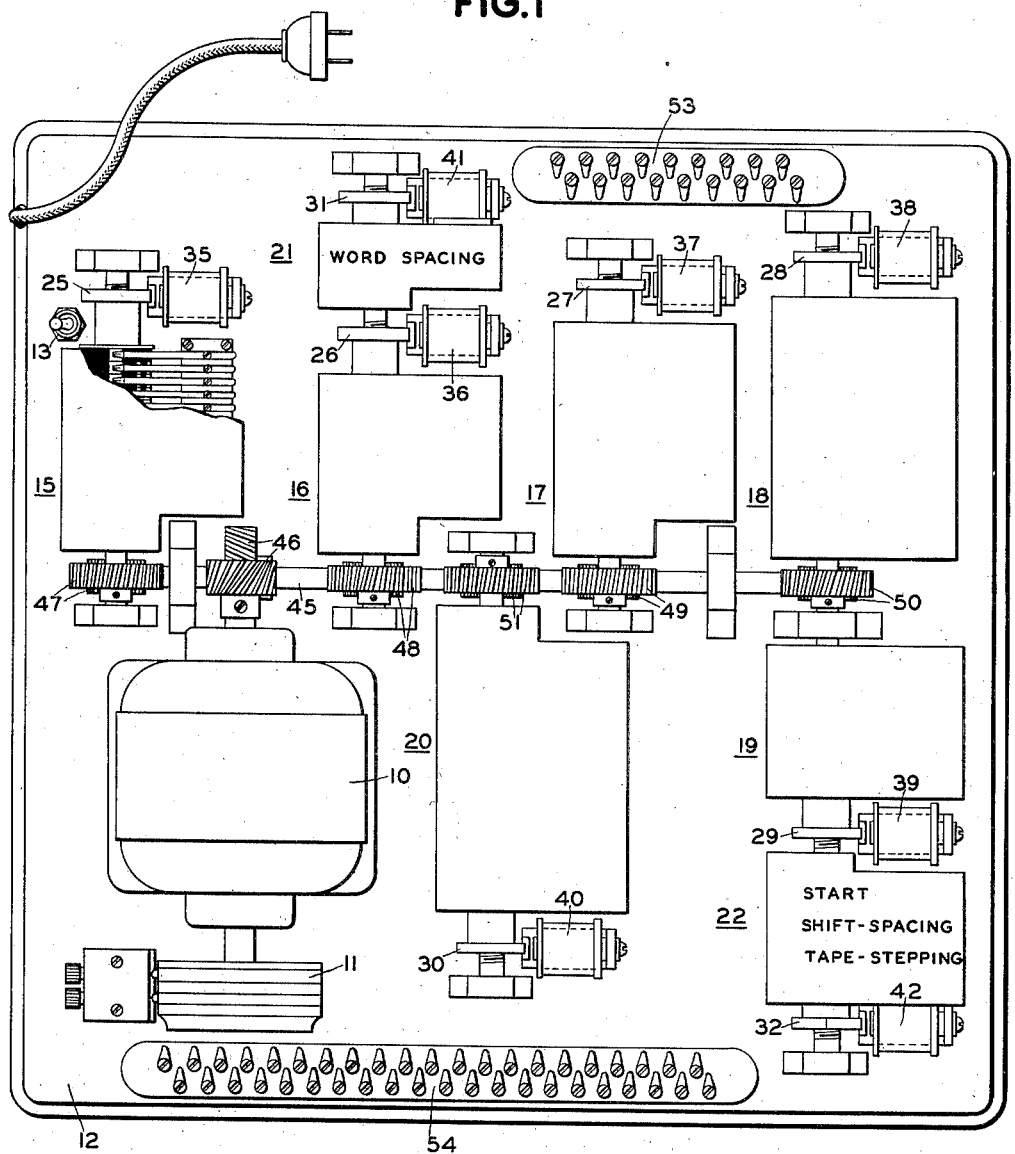
Fig. 1 is a plan view of the Morse code transmitter including the character transmitting drums and control drums, certain of the control relays being omitted.

Referring to Fig. 1 of the drawings, the Morse code transmitter comprises a driving motor 10 provided with an adjustable speed governor 11 and mounted upon a suitable base or panel 12. A switch 13 is provided in the circuit of the motor 10 which normally rotates continuously at constant speed dependent upon the adjustment of the governor 11 when the switch 13 is closed.

Six rotatable character transmitting drums 15, 16, 17, 18, 19 and 20, are adapted to be driven by the motor 10 through reduction speed gearing and individual friction clutches. Two auxiliary rotatable drums 21 and 22 are also provided and are similarly connected to the driving motor 10. Since all of the transmitting and control drums are driven by the motor 10, any change in the speed of the motor affects all of the drums equally, and the transmitting speed may be adjusted over a wide range without affecting the form or spacing of the code signals. Each of said drums is normally restrained from rotation by stop cams 25, 26, 27, 28, 29, 30, 31 and 32, respectively, the latter being controlled by latch magnets 35, 36, 37, 38, 39, 40, 41 and 42, respectively. The cams 25, 26, 27, 28, 30 and 31 are arranged to permit one complete revolution of the associated contact drum when released or unlatched by a momentary energization of the associated latch magnets. The stop cam 29 is arranged to permit the associated contact drum 19 to make one-half a revolution upon each release impulse and the stop cam 32 is arranged to permit the associated contact drum 22 to make one-quarter of a revolution upon each release impulse.

As shown, a drive shaft 45 is mounted upon the base 12 and connected through reduction gearing 46 to the driving motor 10. Reduction gearing 47 is provided between the drive shaft 45 and shaft carrying the character transmitting drum 15. Reduction gearing 48 is provided between the drive shaft 45 and the shaft carrying the rotatable drums 16 and 21. Reduction gearing 49 is provided between the driven shaft 45 and the shaft carrying the rotatable drum 17. Reduction gearing 50 is provided between the drive shaft 45 and the shaft carrying the rotatable drums 18, 19 and 22. Reduction gearing 51 is provided between the drive shaft 45 and the shaft carrying the rotatable drum 20. As the rotatable drums are intended to rotate at different speeds because of the difference in the lengths of the various Morse code signals, the reduction gear ratios between the shaft 45 and the respective drums are selected to effect the desired speed relation. In the embodiment shown, the character transmitting drum 15 is arranged to transmit the Morse code signals for the fractions ⅛, ¼, ⅜, ½, ⅝, ¾ and ⅞. The drum must rotate slowly and the ratio of the reduction gearing 47 may for example, be 18 to 1. The character transmitting drum 16 may be arranged to transmit the letters A, I, N, S, which require a shorter time for transmission, and the ratio of the reduction gearing 48 may, therefore, be 4 to 1. Likewise, the ratio of the reduction gearing 49 may be 5 to 1 where the drum 17 is arranged to transmit the characters D, F, H, L, N, O, U and the figure 0. The ratio of the reduction gearing 50 may be 6 to 1 where drum 18 is arranged to send the characters B, C, G, K, P, Q, R, V, W, X, and the drum 19, which makes half a revolution during each cycle, is arranged to send the characters E and T. The ratio of the reduction gearing 51 may be 7 to 1 where the drum 20 is arranged to send the characters J, Y, Z, &, and the figures 1 to 9, inclusive. It will be obvious that in case a different code is employed, the drive ratio and the distribution of the characters on the respective drums may be similarly arranged in accordance with the transmitting times of the respective code signals.

The Morse code transmitter further comprises control relays shown in Fig. 4, which may be mounted on or adjacent the base 12, and the terminals blocks 53 and 54 (Fig. 1) to which the connections may be made from the tape transmitter or other control apparatus to the circuits of the release magnets and contact drums and from the Morse code transmitter to the Morse sending circuit.

Figure 2:
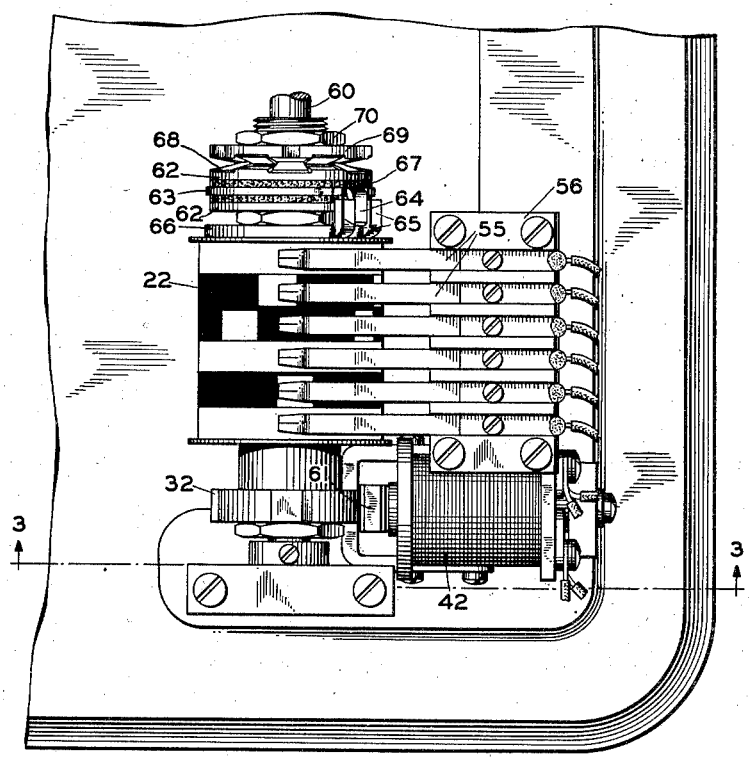
Figs. 2 and 3 are plan and front elevational views on an enlarged scale of one of the rotary control drums shown in Fig. 1.
Figure 3:
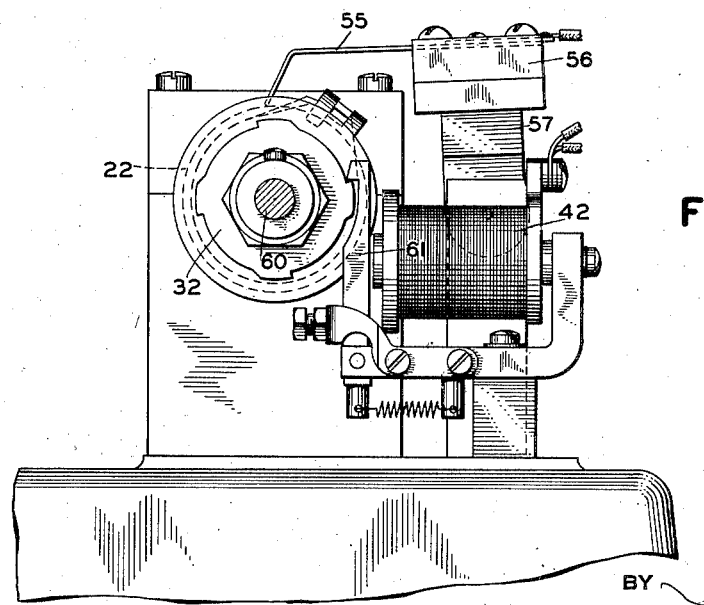

As shown in Figs. 2 and 3, the contact drums which are all of similar construction except for the number and character of the individual contact segments consist of a series of segments or code rings upon which a plurality of contact brushes or springs 55 bear. The brushes or springs 55 of each contact drum are mounted upon an insulating block 56 which is carried by a tiltable frame or yoke 57, permitting adjustment of the contact pressure between the brushes and the contact drums. Since the construction of the contact drum 22 is typical of all of the contact drums, the detailed construction of the other drums is not shown.

The drum 22, as shown in Figs. 2 and 3, is rotatably mounted upon the normally rotating shaft 60, the drum being restrained from rotation by the stop cam 32 until the latching armature 61 of the latch magnet 42 is momentarily withdrawn from the cam. Upon the energization of the latch magnet 42, the contact drum is rotated until a shoulder of the stop cam 32 is again engaged by the latch 61.

The rotation of the contact drum 22 when released by the latch magnet 42 is effected by a friction clutch comprising two discs 62 secured to the rotating shaft 60 and embracing a friction disc 63 having a projecting lug 64 adapted to engage the lugs 65 formed upon an end plate 66 secured to the contact drum. The friction disc 63 is gripped between friction pad members 67 of fabric or other suitable material pressed against the disc 63 by a spring plate member 68, the tension of the spring member being adjustable by adjustment of the backing plate 69 and lock nut 70. In this manner the friction between the members of the friction clutch may be adjusted as desired. It will be apparent that the specific construction of the impulse generating drums may be widely varied without departing from the scope of the invention, the construction shown being merely illustrative of a preferred embodiment having the advantages of ruggedness and durability such that the apparatus will operate for prolonged periods without maintenance or adjustment.

The detailed circuits of the Morse code transmitter and associated control apparatus in a market quotation system are shown in Fig. 4. In the system illustrated a plurality of tickers 75 and 76 are connected to a permutation code transmitter 77 as in the ordinary quotation distributing system for handling market quotations. The tickers 75 and 76 may, for example, be self-winding or high speed tickers adapted to be controlled by six-unit start-stop printer telegraph signals, and may be of the construction shown in Letters Patent No. 1,916,168 to Dirkes and Wheeler, dated June 27, 1933, and assigned to The Western Union Telegraph Company. A reperforator 78, which may be similar to that shown in Letters Patent No. 1,931,790, to Dirkes and Kimball, dated October 24, 1933, and assigned to The Western Union Telegraph Company, is connected to the transmitter 77 to store the signals to be retransmitted by the Morse code transmitter. In the system shown, the tickers 75 and 76 may be located in brokers' offices where it is desired to receive market quotations on the tape and the reperforator 78 may be located in an office where it is desired that the attendant receive the quotations in the form of Morse code signals for posting the same directly upon the blackboard or for other purposes. The perforated tape in which the signals are stored is fed into an associated tape transmitter 79 which may, for example, be similar to that shown in Letters Patent No. 1,298,440 to Benjamin, granted March 25, 1919, and assigned to The Western Union Telegraph Company.

The tape transmitter 79 comprises a plurality of contact members adapted to be operated selectively in accordance with the perforations in the tape, and a stepping magnet 80 for advancing the tape. Obviously various types of storage transmitters may be employed to control the Morse transmitter. An autostop contact 81 is provided in connection with the loop of tape between the reperforator 78 and transmitter 79, and arranged to open the associated control circuit when the loop of tape is shortened, indicating that only a predetermined number of characters is stored between the reperforator and the transmitter.

The contacts of the transmitter 79 are connected to the windings of six selector relays 91, 92, 93, 94, 95 and 96, having their armatures and contacts connected to form a fan circuit whereby battery potential may be applied to any one of the sixty-four contacts of relay 96 in accordance with the selective operation of relays 91—96 by the contacts of the transmitter 79. An auxiliary relay 99 is connected in series relation with the relay 91 and becomes energized when the circuit of relay 91 is closed. The contacts of relay 96 are connected to the individual segments or code rings of the character transmitting drums of the Morse transmitter and effect the operation of the sounder 100 to reproduce Morse code signals corresponding to the characters stored in the tape in the form of permutation or equal-length code signals. Other types of receiving or repeating apparatus may be substituted for the sounder 100 if desired.

Contact or code rings 101—106 of the transmitting drum 16 are shown in developed form in Fig. 4. Each of the character transmitting drums is provided with contact rings corresponding to the rings 101, 102, 105 and 106, the corresponding rings of the drum 19 being indicated at 111, 112, 115 and 116. The last-mentioned rings have twice as many contact segments because the drum 19 only makes half a revolution during each cycle of operation. The contact rings 103 and 104 embody segments corresponding to the Morse code signals for the characters I and A respectively, and each half of the contact rings 113 and 114 embodies segments corresponding to the Morse code signals for the characters E and T, respectively. The other character transmitting rings on the drum 16 and on the character transmitting drums 15, 17, 18 and 20 are omitted from the drawing for the sake of simplicity. The contact rings 121 and 122 on the control drum 21, and 123, 124, 125, 126, 127 and 128 on the control drum 22 are shown in developed form.

The operation of the Morse code transmitter will be clear from the steps involved in repeating the character A, the Morse code signals for the other characters being reproduced in a similar manner upon the selection of the proper transmitting ring of one of the transmitting drums by the selector relays 91—96. Assuming that the character A is perforated in the tape at the point engaged by the feeler pins connected to the contacts of the transmitter 79, the second and third contacts of the transmitter are actuated to close the circuits of relays 92 and 93. Upon the energization of relays 92 and 93, a circuit is closed from battery through the armatures and back contact of relay 91, the outer armature and front contact of relay 92, the second armature and front contact of relay 93, the fourth armature and back contact of relay 94, the seventh armature and back contact of relay 95, the thirteenth armature and back contact of relay 96, the conducting segments of rings 104 and 106 of drum 16, the winding of release magnet 36, the conducting segments of rings 124 and 123 of control drum 22 and the armature and front contact of normally energized relay 131 to ground whereupon the magnet 36 becomes energized and releases the drum 16 for one revolution. As the drum 16 rotates, the circuit of the magnet 36 is interrupted at the ring 106, deenergizing the release magnet, and the winding of the sounder 100 is connected through the ring 105 to the conducting segments of the ring 104.

As the drum 16 continues to rotate, the battery potential applied to the segments of ring 104 through the selector relays 91—96 is connected to the coil of the sounder 100 to form the dot-space-dash signal (- —) representing the character A in Morse code. Then a circuit is closed from battery through the rings 101 and 102, the winding of release magnet 42 of the control drum 22 and the winding of relay 132 to ground whereupon relay 132 is energized and the control drum 22 is released for one-quarter of a revolution. As the drum 22 rotates, four operations occur, as follows:

First, the conducting segment of the commutator ring 124 moves out of engagement with the associated brush thereby opening the above described start circuit including the release magnet 36. Since the circuits of the release magnets of all of the character transmitting drums are connected in series with the contact brush of the ring 124, the circuits of all of said magnets are opened thereby preventing the release of any of the character transmitting drums until the control functions have been completed and the control drum 22 has made a quarter of a revolution to bring the next conducting segment on the ring 124 into engagement with the associated brush.

Second, a conducting segment of the ring 128 of the tape stepping commutator portion of the control drum 22 engages its associated brush whereupon a circuit is established from battery through the rings 128 and 127 to energize relay 133. Relay 133 becomes energized and closes a circuit from battery through its armature and front contact for energizing the stepping magnet 80 of the tape transmitter 79. When the segment of the ring 128 moves out of engagement with its associated brush, the circuit of relay 133 is interrupted and the stepping magnet 80 is deenergized to cause the tape in the tape transmitter to be stepped ahead and to position the transmitting contacts of the tape transmitter in accordance with the perforations in the tape whereupon a new selection is set up in the selector relays 91 to 96 of the fan circuit.

Third, the conducting segment of the ring 126 of the control drum 22 engages its associated brush thereby closing a circuit from battery through the rings 126 and 125 for energizing relay 134. Relay 134 becomes energized and closes the circuit from ground through its armature and front contact, winding 135 of the polar relay 137, the right hand armature and back contact of relay 99 and the armature and back contact of relay 133 to battery. Relay 137 is provided with two opposing windings 135 and 136 which are connected respectively to the back and front contacts of one of the armatures of relay 99. The operation of the armature of the polar relay 137 therefore depends upon the condition of relay 99, i. e., whether this relay is energized or deenergized, for a purpose that will be explained hereinafter.

Fourth, the conducting segment of ring 126 moves out of engagement with the associated brush, thereby opening the circuit of relay 134, and the control drum 22 is brought to a stop by the stop cam 32. Another conducting segment of the ring 124 is now held in engagement with its associated brush in readiness to start the transmission of the new characters set up in the fan circuit by the selector relays 91—96, the reproduction of the Morse code signals for this character being effected in the same manner as that just described.

The time lag between separate characters is fixed normally by the rotation of the control drum 22. The control drum is not released until the character has been transmitted and therefore a short period elapses between the transmission of one character and the beginning of the next character. During the partial rotation of the control drum 22 which occurs in each cycle of operation, the character transmitting drum 16 or any other character drum which has been rendered operative completes its revolution and is stopped at its normal position by the stop cam 26.

In Morse code the character E is the shortest character, being transmitted by making a single dot. The character I is next, requiring two dots. Separate letters are normally separated by a space equal to the length of a dash, but the letters C, O, R, Y, Z and "&", however, are combinations of dots and spaces. Since the space in a letter such as R is practically the same as the normal space between letters, it is obvious that letters such as R, E, I, etc., must be spaced farther than normal from adjacent letters to provide clearly distinguishable Morse code. To accomplish this the short letters E, I and the space letters C, O, R, Y, Z, and "&" are placed on transmitting drums which allow extra space on the contact segments before and after each letter. For example, the characters E and T are on the transmitting drum 19. Thus, although T is transmitted as a dash and E as a single dot, the time for transmitting the two characters is the same so as to provide additional spacing between the character E and the preceding and succeeding characters. The conducting segments for the letters C, R, O, Y and Z are similarly positioned upon their respective transmitting drums in a manner to provide additional spacing before and after each of the characters. It will be obvious that when two or more of these letters appear together, the space between them is doubled so that they are clearly distinguishable.

The spacing between words should be different from that between separate characters. In the preparation of the perforated tape for high speed tickers, the "letter dot" is used to space the words of a message on the tape. This is necessary because of the fact that the ticker must print a character each time it steps the tape ahead and in order to step the tape away from the typewheel so that it can be read immediately, several letter dots are perforated in the tape. It is obvious that for the letter dots perforated between the words of the message, each letter dot selection in the Morse transmitter must cause a space signal to be introduced in the Morse to indicate a new word, but when several letter dots are inserted consecutively in the tape, it is desirable to step the tape as rapidly as possible through the tape transmitter without delaying the Morse code transmission.

The letter dot selection upon being set up in the selector relays 91—96 by the tape transmitter applies positive battery to the ninth contact L of relay 96 thereby closing a circuit through the right hand outer armature and front contact of normally energized relay 138, the resistance R and the winding of relay 139 to ground: whereupon relay 139 becomes energized. Upon the energization of relay 139 the circuit is closed from battery through the left hand armature and front contact of said relay, the right hand outer armature and back contact of relay 140 and the winding of release magnet 41 of the control drum 21 whereupon said control drum is released and starts to rotate. When the conducting segment of the ring 121 of the control drum 21 engages its associated brush, a circuit is closed from battery through the control rings 121 and 122, the winding of release magnet 42 of the control drum 22 and the winding of relay 132 to ground, whereupon the release magnet and the relay 132 become energized. If there is only one letter dot in the perforated tape between words as described above, the time required for the rotation of the word spacing commutator 21 is introduced between the words sent in Morse code. This time can be definitely fixed by the positioning of the conducting segment of the ring 121. When the release magnet 42 of the drum 22 is energized, the tape transmitter 79 steps the tape ahead to the new selection.

If there are several letter dots to be stepped through the tape transmitter, the dots are stepped through as rapidly as possible without repeating the release function of the control drum 21. While the first letter dot causes the release of drums 21 and 22 as described above, relay 132 becomes energized and closes a circuit from battery at the letter dot terminal L of relay 96 through the right hand outer armature and front contact of relay 138, the winding of slow release relay 140 and the armature and front contact of relay 132 to ground whereupon relay 140 becomes energized. The energization of relay 140 opens the above described circuit of the release magnet 41 of drum 21 and closes a circuit from battery through the right hand armature and front contact of relay 139, the right hand inner armature and front contact of relay 140, winding of release magnet 42 and the winding of relay 132 to ground whereupon the release magnet 42 is energized to release the control drum 22. In this manner each impulse supplied by each letter dot selection in the tape is repeated by relay 139 to release the control drum 22 causing the tape to be stepped rapidly through the tape transmitter. When the last letter dot has been stepped through the tape transmitter and a new character selection set up in the selector relays 91 to 96, the slow release relay 140 upon becoming deenergized opens the described circuit of the release magnet 42 and recloses the circuit of the release magnet 41. It will be noted that the letter dot and the unison dot terminals L and U are connected together and to the right hand outer armature of relay 138 so that either selection will cause the tape to be stepped through the tape transmitter. The first letter dot or unison dot recorded in the tape causes the word spacing commutator 21 to function, but succeeding letter or unison dots are stepped rapidly through the tape transmitter. This arrangement is applicable where the letter dot or the unison dot is used as a spacer between the words of the message and if other character signals are used to space the words in the ticker, these characters should be similarly connected to operate the word spacing control drum 21.

In the usual transmission of quotations by Morse it is the practice to use a longer spacing between groups of letters and groups of figures which go to make up a quotation than between the individual words of a message. However, in the preparation of the ticker transmitter tape the letter and figure characters are perforated in one continuous succession. The Morse transmitter embodying the invention, however, is arranged to detect the change from letters to figures and vice versa in order to interpose a longer spacing at the time the change occurs. Assuming that letter characters of a quotation are being transmitted, as the end of the last letter is being repeated by Morse transmitter the release magnet 42 of the control drum 22 is energized as described above and the control drum 22 starts to rotate. An impulse is sent to relay 133 which repeats it to the operating magnet 80 of the tape transmitter. This impulse steps the tape ahead and sets up the selection corresponding to the next character in the tape which is a figure instead of a letter. The impulse through the conducting segment of the ring 126 operates relay 134 as described above. The relay 99 being in series with relay 91 is energized whenever a figure selection is set up in the tape transmitter and is deenergized whenever a letter selection is set up. Since under the assumed conditions we have just set up a figure character selection, relay 99 is energized and upon the energization of relay 134 a circuit is closed through the armature and front contact of relay 134 and the figures winding 136 of the polar relay 137 whereupon the armature of the polar relay 137 is operated. It will be apparent that the polar relay 137 operates in response to the energization of relay 99 when a change is made from letters to figures in the transmission and in response to the deenergization of relay 99 when a change is made from figures to letters.

Relay 131 is normally energized through a circuit including either the front or back contact and the left hand armature of relay 99 and the armature and front contact of slow relay 141, the latter relay being energized whenever relay 131 is deenergized. When relay 131 becomes energized it locks up through the armature and either contact of polar relay 137 and its own armature and front contact. However, when relay 137 operates it momentarily interrupts the locking circuit of relay 131 and relay 131 becomes deenergized. It will be noted that whenever relay 131 is deenergized, the above described start circuit including the control rings 123 and 124 is interrupted at the front contact and armature of relay 131.

The energization of polar relay 137 as described above occurs while the conducting segment of the ring 126 of the control drum 22 is in engagement with its associated brush. The consequent momentary deenergization of relay 131 closes the circuit of slow release relay 141 which is adjusted to be slow to pull up and slow to release. Upon the energization of relay 141 the circuit through the winding of relay 131 is reclosed, but as long as relay 131 remains deenergized, the start circuit of the transmitter is interrupted thereby preventing the start of the transmission of the figure character set up in the tape transmitter. In a similar manner the armature of polar relay 137 is again operated when the transmission changes from figures to letters and at the same time relay 99 becomes deenergized so that relay 131 is again momentarily deenergized and the proper spacing is interposed between the group of figures and the ensuing group of characters. The time required for slow relay 141 to draw up its armature is the added time introduced between the groups of letters and figures of the quotation and may be adjusted as desired as, for example, by adjusting the amount of current in the circuit of the relay and the spring tension on its armature.

The autostop contact 81 is arranged to stop the operation of the Morse transmitter when the loop of tape between the reperforator 78 and tape transmitter 79 is shortened to a predetermined extent unless the section of the transmitter tape controlling the feeler pins is in the middle of a word or quotation, the autostop only becoming effective at the end of a word or quotation in order to avoid mutilation of the names or amounts given in the message. Relay 138 is normally maintained energized through a circuit including the contact 81. When the circuit of relay 138 is opened by the shortening of the loop of tape, the relay becomes deenergized and opens three circuits, (1) the circuit of the "tape stepper" and "rubout" selection corresponding to contacts TS and O of the relay 96; (2) the (letters) shift spacing control circuit of relay 99; and (3) the letter dot and unison dot circuit selection corresponding to contacts L and U of relay 96.

Thus, if either the tape stepper or rubout selections are set up in the fan circuit, the circuit of relay 142 is opened at the inner right hand armature and front contact of relay 138 until the autostop contact 81 recloses, whereupon relay 142 becomes energized through the contact rings 123 and 124 of the control drum 22 and the armature and front contact of relay 131. Upon the energization of relay 142, a circuit is closed from battery through the armature and front contact of relay 142 for energizing release magnet 42 of the control drum 22 whereupon the stepping magnet 80 of the tape transmitter 79 is energized momentarily to step the tape to the next character as described above.

The opening of the shift spacing control circuit as described above holds the start circuit open at the contacts of relay 131 when the latter relay becomes deenergized between a group of figures and a group of letters in the quotation being transmitted. The deenergization of relay 131 closes the circuit of relay 141 but relay 141 cannot reclose the circuit of relay 131 as described above until relay 138 again becomes energized. The start circuit including release magnets 35, 36, 37, 38, 39 and 40 is thus held open until the loop of tape is lengthened to permit the reclosure of the autostop contact 81. The autostop does not stop the Morse transmitter, however, between a group of letters and a group of figures because the circuit of relay 131 from the contact of relay 141 through the left hand armature and front contact of relay 99 does not include a contact of relay 138. The system may however be arranged to stop the Morse transmitter between a group of letters and a group of figures if desired in the same manner as between a group of figures and a group of letters.

Since the letter dot and unison dot characters are perforated in the tape to step the tape out of the ticker, it is permissible to stop the transmission by the autostop contact 81 when a letter dot or unison dot is in the transmitter 79. If relay 138 is deenergized by the actuation of the autostop contact 81, the above described circuit of relay 139 is interrupted at the right hand outer armature of relay 138 and the stepping of the tape ceases until the autostop contact 81 recloses.

It will be apparent, therefore, that when the autostop contact 81 opens the circuit of relay 138, the stepping of the tape through the tape transmitter 79 ceases if or as soon as the tape stepping, rubout, letter dot or unison dot selection occurs in the tape or if a shift is made from figures to letters indicating the beginning of a new quotation. Obviously the autostop may be modified in various ways to effect any desired result in accordance with the preferred arrangement shown and described.

The fan circuit shown provides for sixty-four selections of which only part may be used. Since an unused combination may be accidentially selected, means are provided to cause such a selection to step the tape ahead immediately. In the system shown, the third, thirty-third, thirty-sixth, thirty-seventh, thirty-ninth, fortieth, forty-second, forty-third, forty-sixth, fifty-ninth, sixty-second and sixty-third selection terminals are unused, and these terminals are all connected to the winding of relay 142. Thus a selection of one of these terminals causes the energization of relay 142, whereupon a circuit is closed from battery through the armature and front contact of relay 142 for energizing release magnet 42 of control drum 22 which effects the stepping of the tape through the tape transmitter 79 as described above.

It will be apparent that the apparatus described may be readily modified to convert various equal-length or tape-recorded code signals into corresponding code signals of different character. Among other uses of the Morse transmitter may be mentioned the transmission of Morse code over wire or radio channels under the control of a tape or other storage medium and the teaching of code signal reception to operators. Various modifications of the system and apparatus described are, therefore, deemed to come within the scope of the invention as defined by the appended claims.

We claim:

1. A telegraph system comprising a transmitting circuit, means for transmitting equal-length permutation character code signals over said circuit, means connected to said circuit for storing said signals, a second transmitting circuit and means including said storing means for repeating the signals in the form of unequal-length code signals over said second circuit with unequal spacing between characters and words.

2. A telegraph system comprising a transmitting circuit, means for transmitting equal-length permutation code signals over said circuit, a tape reperforator connected to said circuit to record said permutation code signals, a second transmitting circuit, a tape transmitter associated with said reperforator and with said second circuit and means including said tape transmitter for repeating said code signals in the form of intelligible dot-and-dash code signals over said second circuit with variable spacing between characters.

3. A telegraph system comprising a transmitting circuit, means for transmitting equal-length permutation code signals over said circuit, a tape reperforator connected to said circuit, a second transmitting circuit, a tape transmitter associated with said reperforator and connected in said second circuit, means associated with said tape transmitter for converting the code signals repeated by said tape transmitter into unequal-length Morse code signals in said second circuit with variable spacing between characters and means for stepping said tape transmitter under the control of said converting means.

4. A telegraph system comprising a transmitting circuit, means for transmitting equal-length permutation code signals over said circuit, a tape reperforator connected to said circuit, a second circuit, a tape transmitter associated with said reperforator and said second circuit, an unequal-length code signal transmitter in said second circuit variably operated by said tape transmitter and means including said last mentioned transmitter for producing audible intelligible Morse code signals representing the same characters as those perforated in the tape.

5. In a telegraph system, means for transmitting permutation code signals, and means including a series of contacting devices for converting said signals into audible signals in Morse code with variable spacing between characters.

6. In a telegraph system, means for recording permutation code signals and means controlled by said signal recording means for generating unequal-length audible Morse code signals.

7. In combination, a permutation code transmitter, a second transmitter comprising a plurality of transmitting elements each corresponding to a particular character and means including said permutation code transmitter to render said elements of the second transmitter operative one at a time in accordance with the characters to be transmitted.

8. A telegraph system comprising a signal storage unit, a transmitter controlled thereby, means for storing a group or groups of character signals in said storage unit, means for stopping the transmitter when the number of character signals stored in the storage unit drops below a predetermined number and means to render said last-mentioned means inoperative except at the end of a group of character signals.

9. A telegraph system comprising a signal storage unit, a transmitter controlled thereby, means for storing character signals in the storage unit and means jointly responsive to the number of stored signals in said unit and to a predetermined selective operation of the transmitter for stopping the transmitter.

10. A telegraph system comprising a signal storage unit, a transmitter controlled thereby, means for storing groups of character signals in said storage unit and means to automatically start and stop the transmitter only between the groups of signals.

11. In a market quotation system, a telegraph transmitting circuit, a plurality of tickers connected to said circuit, means for transmitting equal-length permutation code signals over said circuit to control said tickers and means connected to said circuit for converting said signals into audible unequal-length code signals.

12. A market quotation system comprising a transmitting circuit, means for transmitting equal-length permutation code signals over said circuit and means connected to said circuit for reproducing said signals in the form of audible unequal-length code signals.

13. A market quotation system comprising a transmitting circuit extending to brokers' offices, tickers located in certain of said offices, means for transmitting equal-length permutation code signals over said circuit to operate said tickers and means connected to said circuit at one of said offices for reproducing the quotation signals in the form of audible Morse code signals.

14. A telegraph transmitter comprising a plurality of rotatable contact drums, each of said drums having a plurality of contact segments adapted to transmit code impulses of a predetermined length and spacing, means for rotating said drums at different rotative speeds one at a time, and means for rendering certain of said contact segments operative in sequence to produce unequal-length code signals.

15. A telegraph transmitter comprising a rotatable contact drum, a plurality of contact springs engaging the periphery of the drum and a movable support for said contact springs adapted to vary the contact pressure thereof simultaneously.

16. A telegraph transmitter comprising a plurality of rotatable contact drums, means for normally preventing rotation of said drums, common driving means for all of said drums and electro-responsive means for individually controlling the rotation of each of said drums by said driving means.

17. A telegraph transmitter comprising circuit-closing means for forming code signals corresponding to each of a plurality of characters, means for controlling said circuit-closing means to send a succession of code signals and means for varying the spacing between individual code signals in accordance with the character thereof.

18. A telegraph transmitter comprising circuit-closing means for forming code signals corresponding to each of a plurality of letter characters and figure characters and means for spacing a group of letter characters from a group of figure characters and for differently spacing a group of letter characters from another group of letter characters.

19. A telegraph system comprising a code signal transmitter, a tape, means for recording code signals including spacing signals on the tape, a tape transmitter controlled by said tape, means including said tape transmitter for controlling said code signal transmitter and means responsive to the occurrence of a plurality of successive spacing signals on the tape to feed the tape through the tape transmitter while the code signal transmitter is disabled.

20. A telegraph system comprising a code signal transmitter, a tape, means for recording individual groups of code signals on the tape, a tape transmitter controlled by said tape, means including said tape transmitter for controlling said code signal transmitter and means for stopping the tape transmitter, said last-mentioned means being inoperative until the end of a group of recorded code signals.

21. A telegraph system comprising a code signal storage transmitter, a second transmitter adapted to form code signals of a different character from the first mentioned transmitter and means including said first-mentioned transmitter for controlling said second transmitter to repeat certain of the stored signals and to disable the second transmitter in response to a predetermined stored signal.

22. A telegraph system comprising means for storing permutation code signals representing intelligence characters, a transmitter controlled by said storing means to repeat the signals and means responsive to one of said signals for stopping the transmitter.

23. A telegraph system comprising means for storing a continuous series of intelligence character code signals during a predetermined period of operation, a transmitter controlled by said storing means to repeat the signals and means operative before the ends of said series of signals but only between groups of signals for stopping the transmitter.

24. In a market quotation system, means for storing a continuous series of permutation code signals representing letter and figure characters forming two or more unspaced quotations, a transmitter controlled thereby to repeat said signals and means operative during said series only at the end of a quotation for stopping said transmitter.

25. In a market quotation system, a transmitter, signal storage means for controlling said transmitter to send quotations consisting of letter characters and figure characters and means including said storage means for stopping said transmitter as the transmitter shifts to a letter character from a figure character.

26. A telegraph system comprising a tape, a transmitter controlled thereby, means for recording unspaced groups of code signals representing intelligence characters on said tape and means for stopping the transmitter when the number of recorded signals on the tape between the transmitter and the recording means drops below a predetermined number, said means for stopping the transmitter being only operative at the end of a group of recorded signals being sent by said transmitter.

PERCY L. MYER.
EVAN R. WHEELER.